July 8, 1941.  C. S. DRAPER ET AL  2,248,748
MAGNETIC COMPASS
Filed Jan. 21, 1938  6 Sheets-Sheet 1

INVENTORS
CHARLES STARK DRAPER
WALTER McKAY.
BY

ATTORNEY

July 8, 1941.  C. S. DRAPER ET AL  2,248,748
MAGNETIC COMPASS
Filed Jan. 21, 1938    6 Sheets-Sheet 2

INVENTORS
CHARLES STARK DRAPER
WALTER McKAY
BY
Joseph H. Lipschutz
ATTORNEY

July 8, 1941.  C. S. DRAPER ET AL  2,248,748
MAGNETIC COMPASS
Filed Jan. 21, 1938  6 Sheets-Sheet 3

INVENTORS
CHARLES STARK DRAPER
WALTER McKAY
BY
Joseph H. Lipschutz
ATTORNEY

Patented July 8, 1941

2,248,748

UNITED STATES PATENT OFFICE 2,248,748

MAGNETIC COMPASS

Charles Stark Draper, Cambridge, Mass., and Walter McKay, Brooklyn, N. Y., assignors to Sperry Products, Inc., Brooklyn, N. Y., a corporation of New York Application January 21, 1938, Serial No. 186,156

7 Claims. (Cl. 33—222)

This invention relates to magnetic compasses and has for its principal object to devise a method and means for improving the action of such compasses. More specifically, the invention has two fundamental objects. The first of these is to enable a magnetic compass to be utilized for the purpose of enabling a pilot of a craft to fly a straight course. The second specific object is to provide a magnetic compass which will enable a pilot to turn his craft in azimuth in the proper direction and at the proper rate of turn by reference to the magnetic compass alone and without the aid of other instruments.

To accomplish the first of the above specific objects, namely, to devise a magnetic compass which will enable a pilot to fly a straight course, it is necessary to achieve substantial elimination of the northerly turning error which is a characteristic of all known magnetic compasses now in use. The northerly turning error has been variously defined, but for the purposes of this invention the term as used throughout the following specification and in the appended claims has the following definition: It is the error which is experienced by the compass card at the end of the interval required for the craft to assume its proper bank angle as the craft starts to turn out of north. This definition applies as well to the case where the pilot does not consciously desire to turn the craft out of a northerly course but where the craft oscillates in yaw or suddenly deviates slightly from its course, and as a result the compass card automatically assumes an angle of tilt. The northerly turning error in this case would be the error which the card experiences at the end of the tilting interval which would coincide with the end of the yawing oscillation or the sudden slight deviation from the course. In other words, in each case the horizontal component of the acceleration forces set up during turning or yawing acts upon the card to produce northerly turning error. As is well known in this art, the northerly turning error may cause the compass card to turn in the same direction as the craft and at substantially the same rate, so that it is not possible for the pilot of an aircraft to determine by looking at his compass card whether he is turning in the proper direction, at the proper rate, or, indeed, in certain cases, whether or not he is turning at all, since in these certain cases the relationship of the card to the craft tends to remain substantially unchanged during the interval just described, that is, the interval required for the craft to start a uniform turn. The common case comprises that in which the compass card turns in the same direction as the craft and at a faster rate in the initial instants, hence indicating to the pilot a turn in the opposite direction to that which his craft is making. As a result of this condition, various other devices are employed upon aircraft in order to enable the pilot to determine the proper direction and rate of turn. These instruments comprise the directional gyro and the turn indicator. In other words, if the pilot is attempting to fly a straight course, it is not possible for him to detect yawing movements or other turning movements away from the desired straight course by looking at his magnetic compass, because of the fact that the northerly turning error is turning the compass in the same direction as the craft. Therefore, the pilot watches rather his other instruments, such as his turn indicator and directional gyro, to fly a straight course since these instruments detect turns away from said course. It is obvious, however, that if the northerly turning error could be substantially eliminated from the magnetic compass, the pilot would be able to fly a straight course merely by guiding himself with reference to the magnetic compass alone and without the use of the other instruments. It is the first of the specific objects mentioned above substantially to eliminate the northerly turning error so that the afore-mentioned desirable result may be achieved, namely, that the pilot may fly a straight course without the aid of instruments other than the magnetic compass since the latter would detect turning movements of the craft away from the straight course.

It will become apparent in the following detailed description of the invention that it is possible to eliminate the northerly turning error without, however, eliminating the phenomenon which causes the compass card to follow the craft around in azimuth when the craft makes a substantial turn. The same cause which sets up the northerly turning error is responsible for dragging the card around in azimuth. This, as will become apparent from the following description, is possible even where the northerly turning error is substantially eliminated, for in such case it is possible merely to delay the movement of the compass card in following the craft around in azimuth long enough so that the pilot can detect the beginning of his turning movement from the magnetic compass; but such delay does not prevent the card from eventually following the craft around in azimuth. It is therefore the second of the specific objects mentioned hereinbefore to devise a magnetic compass which will not only be free of the northerly turning error but which may be utilized in addition to enable the pilot to make complete turns in the proper direction and at the proper rate merely by guiding himself relative to the magnetic compass and without the aid of other instruments. In other words, by the first object of this invention a magnetic compass may be provided which will enable a pilot to fly a straight course but when the pilot desires to make a turn he would then have recourse to other instruments such as the directional gyro and turn indicator. By the second object of this invention it is possible for a pilot to fly a straight course or to make turns solely by the aid of the magnetic compass and without the necessity for any other instruments. The theory underlying both objects is fundamentally the same, but the second object is accomplished by an extension of the theory underlying the first object, as will become apparent hereinafter.

Further objects and advantages of the invention will become apparent as the description of the invention proceeds.

In the accompanying drawings.

Figure 2:
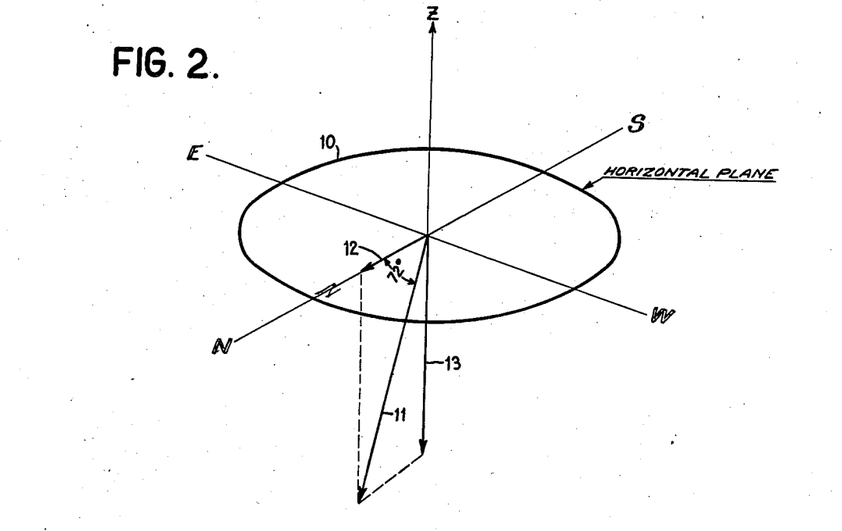
Figs. 2 to 5 inclusive are a set of 3-dimensional diagrams which illustrate the theory of the northerly turning error.
Figure 3:
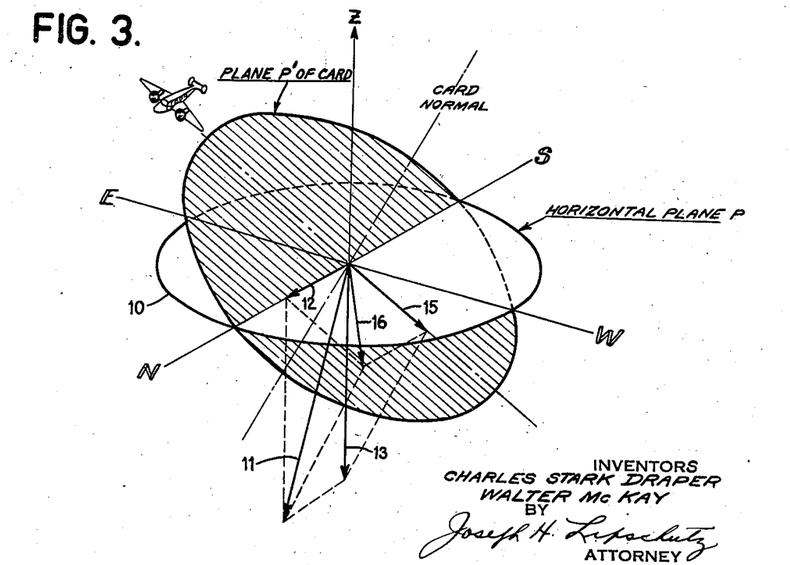

For a thorough understanding of this invention, it is necessary that the theory of the northerly turning error be clearly explained. This is accomplished in the 3-coordinate diagrams of Figs. 2 to 5 inclusive. Referring to Fig. 2, there is shown diagrammatically a compass card 10 with its north point pointing north and the card horizontal. The resultant of the earth's magnetic field in the latitude of New York is shown by the vector 11 which has an angle of dip of 72 degrees. This resultant of the earth's field has a horizontal component 12 and a vertical component 13. When the card is horizontal, the vertical component has no effect upon the action of the card since its projection in the plane of the card is merely the point zero. Therefore, only the horizontal projection 12 influences the card to keep the same in alignment with the plane of the earth's magnetic field. As soon as turning occurs, however, there is an acceleration force, and since all conventional magnetic compasses are pendulous, the card is swung out of the horizontal plane. It is this movement out of the horizontal plane which results in the northerly turning error, for the reasons which will now be explained. Referring to Fig. 3, it is assumed that the acceleration is in an E—W direction and therefore the card is turned about the N—S axis from the horizontal plane indicated at P to the plane indicated at P'. This condition would occur if the airplane were pointed north but had completed getting into its bank preparatory to turning to the west. Referring again to the earth's resultant field 11, it will now be seen that the vertical component thereof 13 which previously has as its projection on the card 10 only the point zero, now is indicated by the vector 15—a definite component in the plane of the compass card 10. The horizontal projection of the resulant 11 is again indicated at 12 but there are now two components of the earth's field in the plane of card 10 and the resultant of said two components is indicated at 16. It will be seen that this resultant 16 is not in the N—S axis of the card, but in the present instance is in a direction west of the N—S axis. The result of this is that the card is swung toward the west. The acceleration which caused the card to tilt from plane P to plane P' is the centrifugal acceleration due to the turning of the craft toward the west and since the new resultant 16 results in turning the compass card also to the west, it will be seen that card and craft move in the same direction, which accounts for the fact that the pilot is unable to determine by reference to the compass, whether or not his craft is turning in the proper direction, whether or not it is turning at the proper rate, and in certain cases whether the craft is turning at all. In this figure, the airplane is still pointed north, but vector 16 is pointing west of north. Hence, if the card quickly follows the motion of vector 16, a turn to the east is indicated to the pilot, i. e., a turn in the wrong direction, an even more undesirable result. The same is true with respect to acceleration in other directions which cause tilting of the card. Thus, for instance, in Fig. 5, the acceleration is such that the card is tilted about an axis 17 intermediate between the E—W and N—S coordinate axes, which condition would occur if the airplane were heading, say, NW, while turning toward west. Here, too, it will be seen that the vertical component 13 of the earth's magnetic field has a projection 20 in the plane of the card, that the horizontal component 12 of the earth's magnetic field has a projection 12' in the plane of the card, and that there results a resultant 16' pointing west of north which causes the card to turn in response to turn of the craft.

Figure 4:
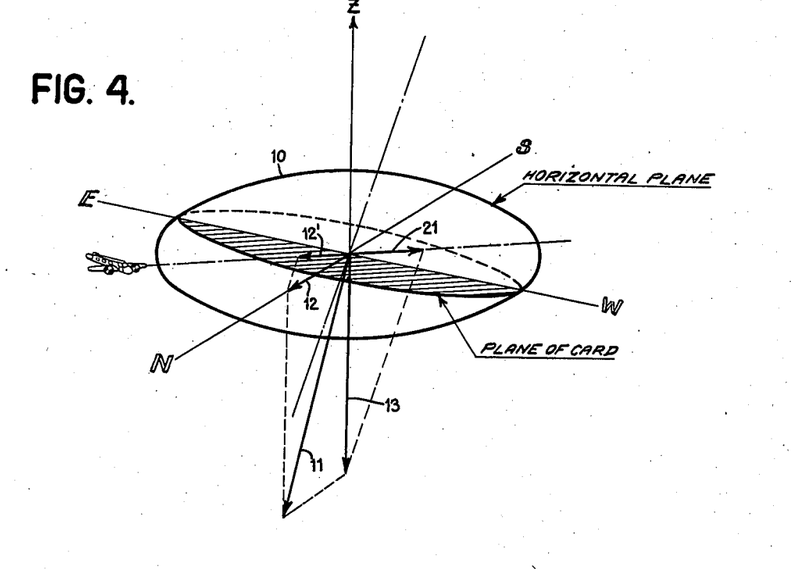
Figure 5:
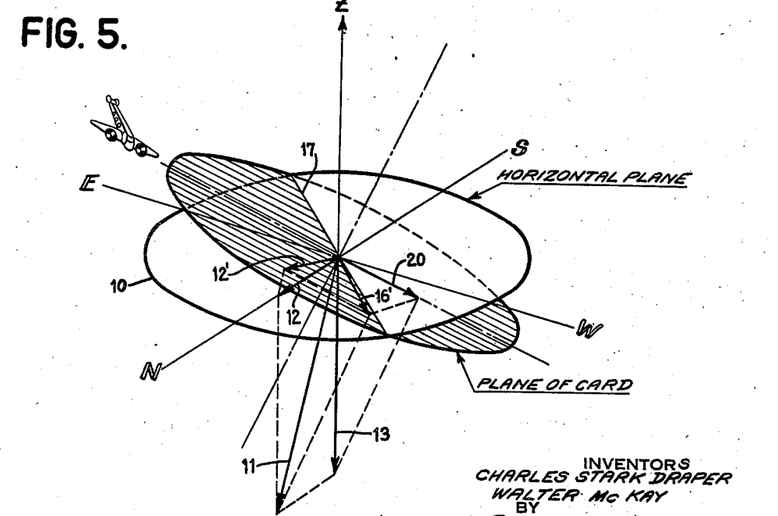

In Fig. 4, there is illustrated the special condition wherein acceleration is set up in such direction as to cause the card to tilt around the E—W axis such as occurs when the airplane is headed west in the course of its turn from north through west. In such case, it will be seen that the projection 21 of the vertical component 13 of the earth's magnetic field in the plane of the card is a vector which is opposite in direction to vector 12' which is the projection of the horizontal component 12 of the earth's field vector in the plane of the card. The direction in which the resultant field vector of the card will move in the remaining portions of the turn depends upon which of the vectors 12' or 21 is greater, and this is determined as follows: If the dip angle is, for example, 72 degrees, as it is at New York, and the angle of bank is less than the complement of the angle of dip, 18 degrees, then the vector 12' will be greater and the resultant field vector in the plane of the card will point north at this instant. If the angle of bank is exactly 18 degrees, then the vectors 12' and 21 will be of the same magnitude and the field will at this instant have no projection in the plane of the card and hence can have no direction momentarily. If, however, the angle of bank exceeds 18 degrees, in the latitude which we assume, then vector 21 is greater than vector 12' and the resultant field vector in the plane of the card will point south at this instant.

From the above discussion, it will be apparent that northerly turning error as defined also exists on turns out of, and oscillations about, other courses than those having a northerly component. Any course having a northerly component will exhibit northerly turning error, diminishing from maximum at N to zero at E & W. On courses having southerly components, the same general causes produce error which, however, is not as serious as northerly turning error because in this case, turn in the proper direction is always shown, but the amount of the turn is exaggerated by the compass. Thus the compass indicates greater turn than has actually been made. In southern magnetic latitude, what has been referred to as northerly turning error refers to courses having a southerly component. At the magnetic equator there is no northerly turning error since there is no vertical component of the earth's magnetic field.

Figure 6:
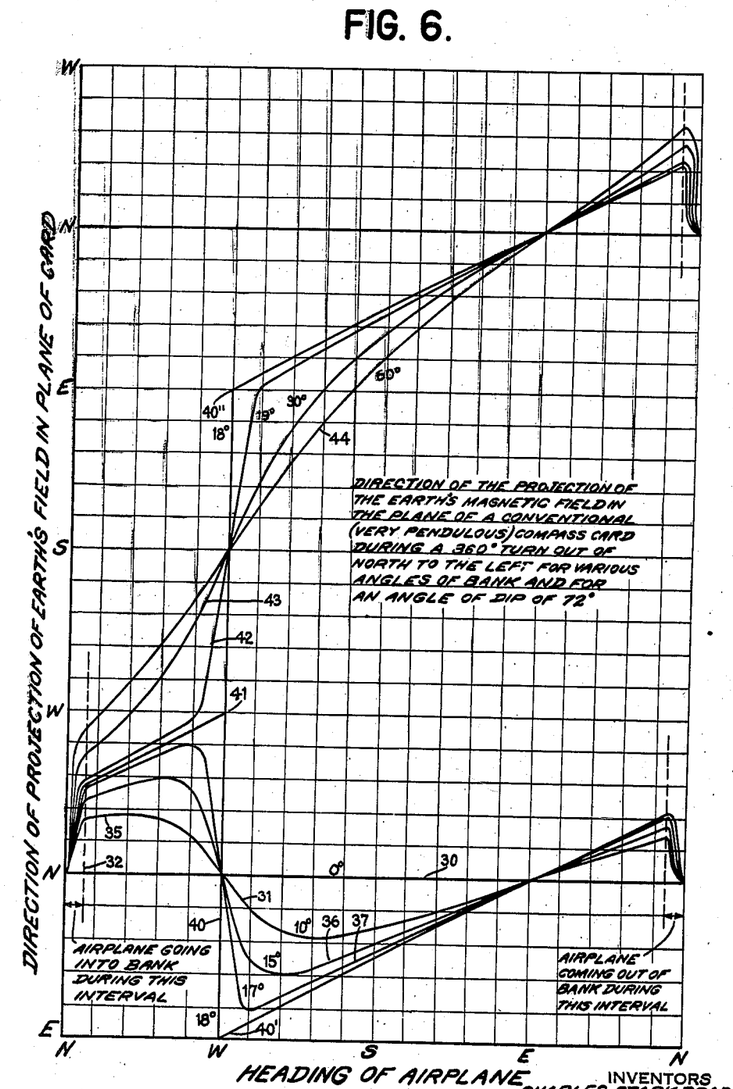
Fig. 6 is a series of graphs which indicate the direction of the projection of the earth's magnetic field in the plane of a conventional magnetic compass card during a complete turn of a craft for a given angle of dip and for various angles of bank.

All the above figures, therefore, illustrate the one point, namely, that since conventional compass cards are pendulous, as they necessarily must be to make them hang level through a wide range of magnetic latitude and to make them stable during straight flight, acceleration forces will cause tilting of the compass card which will cause the vertical component of the earth's magnetic field to have a component in the plane of the card, which component acting in conjunction with the projection of the horizontal component of the earth's field in the plane of the card, gives a resultant which initially causes the card to rotate in the direction of turn of the craft. The action described hereinbefore in connection with the 3-dimensional Figures 2–5 inclusive, may be further illustrated graphically by the graph disclosed in Fig. 6. Thus, assuming that an airplane is turning from north through west, south, east and back to north, then its course is indicated by divisions along the abscissa. In the following discussion, recognition is taken of the fact that the angle of tilt of the compass card is substantially the same as the angle of the bank of the craft. If the angle of bank could be 0 during a turn, an impossible case, there would result the straight line 30 which indicates that the field would always point north. If the angle of bank is, let us say, 10 degrees, then there results graph 31 which shows that during the interval indicated at 32, when the airplane is going into the bank and until it starts a uniform rate of turn, the field vector in the plane of the card moves first toward the west, then oscillates through north, toward east, then back to north, and finally again toward west. The vertical distance between line 30 and the graph 31 indicates the direction of the projection of the earth's field in the plane of the card. Thus it will be seen that instead of maintaining its northerly direction, the projection of the earth's field, which is the resultant 16 of graph 3, is first toward the west of the airplane heading, then toward north, then toward east, then toward north, and finally again toward west. In the interval 32, there is the movement of the field toward the west up to point 35 which is in the direction of the movement of the craft and would be the northerly turning error if the card responded instantaneously to this motion of the field. By reference to graphs 36 and 37 which illustrate banking angles of 15° and 17° respectively, it is seen that the direction of the earth's field vector in the plane of the card departs further from north as the angle of bank is increased. When the bank angle reaches 18 degrees there results the graph 40. It is understood that these graphs are for the latitude of New York with a dip angle of 72 degrees. It will now be seen that at a bank angle of 18 degrees there results the condition shown in Fig. 4 when vector 12' is equal and opposite to vector 21 so that there is no projection of the earth's field in the plane of the card at the instant that the airplane heading is W. This is represented in Fig. 6 by the vertical line 40'—40", which represents a mathematically discontinuous point. The physical significance of this is that at point 41, the direction of rotation of the field vector in the plane of the card changes according as the field chooses to go from point 41 to point 40' or from 41 to 40". If the banking angle is in excess of 18 degrees, however, then we have successively the graphs 42, 43 and 44 which show that the projection of the earth's magnetic field in the plane of the compass card leads the craft around throughout its turn. That is to say, whereas when the banking angle was less than 18 degrees, the projection of the earth's magnetic field on the plane of the compass card oscillated within limited degrees back and forth across the meridian, when the banking angle exceeds 18 degrees, the projection of the earth's magnetic field in the plane of the card follows a complete turn through 360 degrees.

The seriousness of the northerly turning error becomes apparent from the above description. Since the conventional compass card must be pendulous for the reasons listed above, and since the pendulosity of the card renders it subject to acceleration forces whenever turning occurs, and since said acceleration forces necessarily swing the card out of the horizontal plane, there results a magnetic torque caused by the difference in direction between the N—S axis of the card and the projection of the earth's field in the plane of the card which tends to rotate said card in the direction of turn of the craft. The problem therefore is to substantially eliminate this northerly turning error, and for this purpose the following method and means is relied upon and the theory thereof will now be explained. If we refer to Fig. 2 again, we note that the vertical axis of the card is indicated as the Z axis. Applicants have made the discovery that by suitably controlling the period around the Z axis, the above desirable result, namely, substantial elimination of the northerly turning error, may be achieved. Thus, referring to the graph of Fig. 7, there is shown the performance with respect to the feature of northerly turning error of a plurality of compasses of varying Z periods for an angle of bank of 30 degrees. The abscissa of this graph is the course of the airplane, and the ordinates represent compass error divided into two sections, 180 degrees westerly error and 180 degrees easterly error. The graph 50 indicates the direction of the earth's field vector in the plane of the card, that is, it is the direction of the vector 16 as the airplane makes a complete turn and is identical with graph 43 in Fig. 6. The northerly turning error, which is the error of a compass card at the end of the interval 32, as hereinbefore defined, is indicated for a plurality of compasses with varying Z periods. Thus, for instance, a compass with a period of six seconds is indicated by the graph 51 and it shows that the card originally lags a little behind the earth's field, then overruns in the other direction, and finally settles to a point which slightly lags behind the earth's field. When a compass with a Z period of 12 seconds is employed, as in graph 52, it will be seen that the overrunning of the card beyond the earth's field is reduced in both directions, and that the final lag behind the earth's field is slightly increased over that shown in graph 51. However, when a compass with a Z period of 60 seconds is employed, there results the graph 53 which, it will be seen, lags from the very beginning substantially behind the direction of the earth's field. In other words, this card does not follow the travelling earth's field vector in the plane of the card during the initial instants, which following would have resulted in the northerly turning error, but lags greatly behind the same. As a result, the card is not carried around with the travelling earth's field vector during the initial instants of the turn and hence the turning error is greatly reduced. Following this line of investigation further, graphs 54 and 55 progressively indicate the behaviour of compass cards with progressively increasing Z periods, graph 54 indicating the action of a compass with a Z period of 120 seconds, while graph 55 indicates the behaviour of a card with a Z period of 180 seconds. Graph 55 indicates that we have achieved a compass with a practical elimination of the northerly turning error, because it will be seen that in the interval 32 during which the compass has banked and started a uniform turn, there is no appreciable compass error. In other words, the turning error has been substantially eliminated. Since this interval 32 is of sufficiently long duration to exceed the interval of yawing, it will be realized that the northerly turning error during the yawing, oscillatory movements will also be substantially eliminated.

Figure 7:
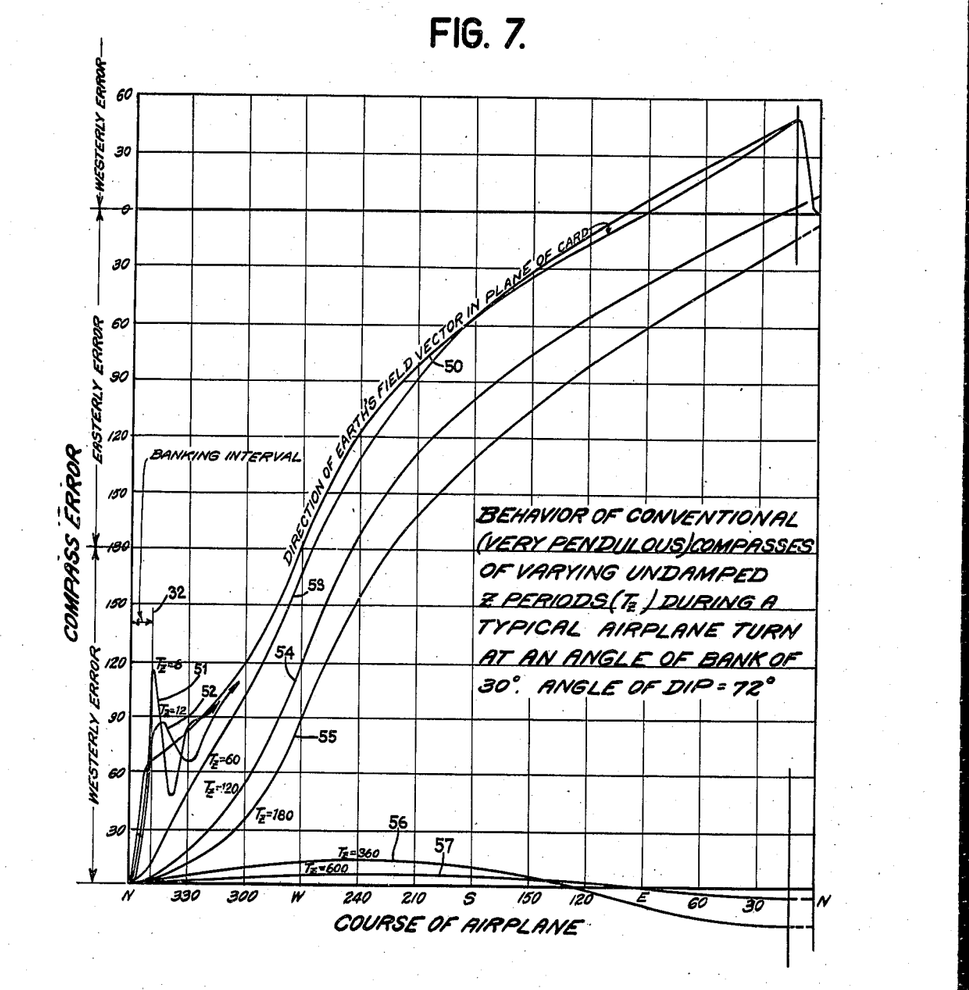
Fig. 7 is a series of graphs illustrating the behavior of conventional compasses of varying undamped Z periods during the first part of a typical airplane turn at an angle of bank of 30 degrees.

Here, then, we have discovered the method by which a pilot is enabled to fly a craft on a straight course without the aid of other instruments for the reason that by substantially eliminating the northerly turning error, the pilot may watch his compass and immediately detect any turning movements of the craft from the straight course, because the compass card during the interval 32 does not follow the movements of the craft. The pilot can therefore right his craft immediately that the craft deviates from the straight course. If, then, a compass is made with a period of, for example, 180 seconds, the performance indicated by curve 55 is obtained which will enable the pilot to fly a straight course by the magnetic compass alone and without the aid of other instruments. When the pilot desires to make a turn off the straight course and into a new course, then he knows that he must look to other instruments such as the directional gyro and the turn indicator. After the interval 32 the card follows the craft around in azimuth as indicated by the curve 55. However, there has been achieved the result which has heretofore been impossible, namely, of obtaining a magnetic compass which will enable the pilot to fly a straight course having a substantial northerly component, without the aid of other instruments.

Figure 8:
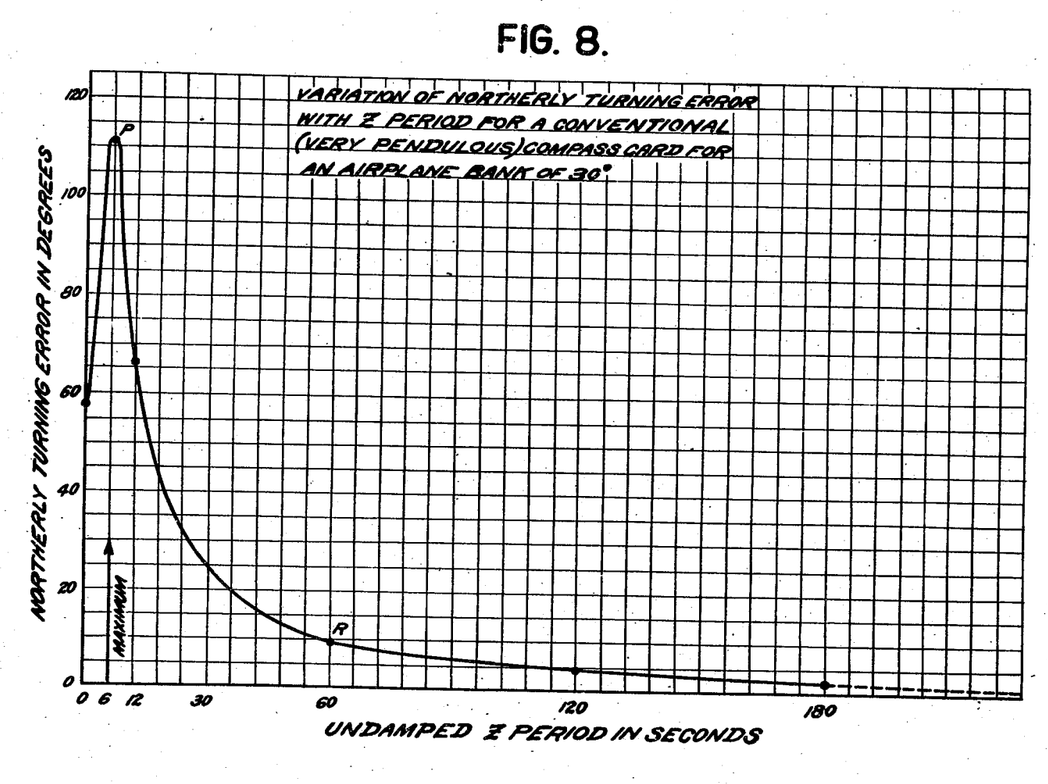
Fig. 8 is a graph showing the variation of the northerly turning error for conventional compass cards with varying Z periods for an airplane bank of 30 degrees.

The result of graphs Fig. 7 may be indicated in a different way in graph Fig. 8 by plotting the undamped Z period in seconds against the northerly turning error in degrees. It will be seen that as the Z period increases from zero to 6 seconds, the northerly turning error is increased, which is what would be expected from graphs 51 and 52 which show that the card actually overruns, that is, runs faster than the travel of the earth's field vector. As the period of the compass is increased, however, beyond point P in Fig. 8, it will be seen that the northerly turning error is progressively and rapidly decreased until, at 180 seconds, there results a condition where the curve of this plot is substantially asymptotic with zero northerly turning error.

The solution described above, namely, of substantially eliminating the northerly turning error by increasing the Z period of the compass to a point where the plotting of turning error against Z period results in a curve which is substantially asymptotic with zero northerly turning error, applies only where the Z period is an undamped period. By undamped period is meant that period which the card would have if there were no damping. Attempts have been made to obtain the same result with a damped period, but an increased damped period will cause only a very slight lag of the card behind the turning movement of the airplane and therefore will not result in a material reduction in the northerly turning error. Any attempt, therefore, to reduce the northerly turning error by increasing the period of the compass through damping, results in an inoperative compass insofar as elimination of northerly turning error is concerned. Therefore, our invention consists not merely in increasing the Z period of the compass to the extent necessary for substantially eliminating the northerly turning error, but also in the provision that the said increased Z period must be an undamped Z period. In use, the card is not totally undamped, due to the necessity for introducing a moderate amount of damping in order to damp down oscillations and thus enable the card to settle on the meridian. The amount of damping referred to hereinbefore is far in excess of this moderate amount. In undamped period, we infer that the damping forces are small compared to inertia forces.

Figures 1, 9:
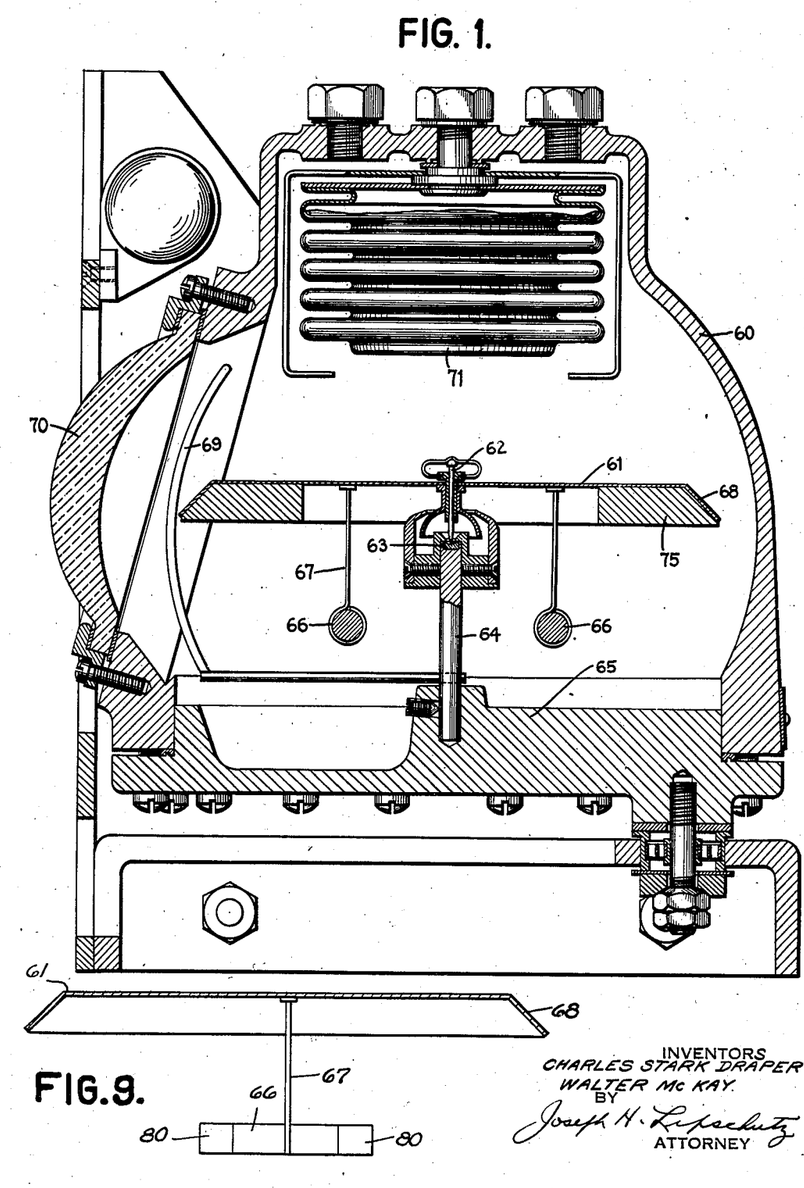
Fig. 1 is a vertical section through a standard magnetic compass which has been modified to embody the principles of this invention.
Fig. 9 is a vertical section through a modified form of magnetic sensitive element.

For carrying the above method of eliminating northerly turning error into effect, we have shown in Fig. 1 a modification of a conventional magnetic compass which embodies the principles hereinbefore described. Said compass comprises a casing 60 filled with fluid, within which operates a compass card 61 which is mounted by means of pivot 62 on the jewel 63 of pivot post 64 fixed in the base 65 of the instrument. The magnets 66 serve also as a gravitational element and for this purpose are suspended from the card below the pivotal mounting of the card by means of brackets 67. The markings on the inclined face 68 of the card may be read with reference to a lubber line 69 through front window 70 of the instrument. The usual expansion chamber 71 is shown in the head of said instrument.

In order to obtain the large undamped period around Z axis, reference is had to the equation for said undamped periods, which is as follows:

$$\text{Undamped period} \propto \sqrt{\frac{\text{moment of inertia}}{\text{magnetic strength}}}$$

From the above equation, it is apparent that the undamped period may be increased in either of two ways, first, by increasing the moment of inertia of the card element around the Z axis, or, second, by decreasing the magnetic strength of the magnets. In the form shown in Fig. 1, the first of these methods is employed, namely, increase of the moment of inertia around the Z axis. This is effected by concentrating a substantial weight adjacent the outer edge of the compass card. This weight may take the form of a solid metal ring 75, and the mass of said ring is predetermined so that the undamped Z period is brought within the desired range, that is, at least to a point where the curve of northerly turning error plotted against undamped Z period approaches zero as an asymptote, beyond the point R in Fig. 8. In the graph shown, this period is in excess of 60 seconds, and in practice a period considerably in excess of this has been found to give the best results.

In an alternative form, the magnet strength would be changed instead of increasing the moment of inertia about the Z axis. In this form, ring 75 would not be employed. Instead, the magnets 66 would be cut off to smaller size, the weight removed being replaced by the same weight of a non-magnetic material 80 such as brass. This would result in decreasing the magnet strength. The purpose of keeping this weight the same is to ensure sufficient pendulousness to the card so that it will be stable in azimuth.

We have now described in full detail how a magnetic compass may be designed in order to be substantially free of northerly turning error and thus enable a pilot to fly a straight course solely by reference to his magnetic compass and without the aid of other instruments. By reference to a curve such as 55 in Fig. 7 it will be seen that should the craft make a substantial turn in azimuth, the compass can no longer be the guiding instrument by reason of the fact that the card, as indicated by this graph, follows the craft around in azimuth after the interval 32 is completed. While the lag during this interval 32 enables the pilot to fly a straight course, the fact that the card eventually becomes activated and follows the craft in azimuth prevents the magnetic compass from being employed as a reference line by which the pilot may determine the direction and rate of turn. For this purpose he would have to rely upon other instruments such as the directional gyro and turn indicator were it not for the fact that we have made the further discovery that by merely extending the principle of our invention outlined above there may be obtained a magnetic compass by which a pilot may not only fly a straight course but may also make complete turns in azimuth solely by reference to said instrument and without the aid of other instruments.

The theory underlying this further discovery is disclosed in graphs 56 and 57 of Fig. 7. It will be seen that when the undamped period around the Z axis is further increased beyond the period indicated by curve 55, which in this case is 180 seconds, there is eventually obtained a curve such as 56 which indicates that if the undamped Z period of the compass is increased to this amount (in the case shown, about 360 seconds), the compass card does not follow the craft around in azimuth, but rather oscillates around the meridian within very narrow limits. This is a result which is unobvious and entirely unpredictable from the action of compasses having periods shown in graphs 51 to 55. From these graphs the result of further increasing the period which would seem obvious and predictable is that the card would lag still further behind the earth's vector but eventually would follow the graph around in azimuth. This is not the case. Furthermore, it is found that the greater the increase in the Z period the smaller is the oscillation around the meridian, in other words, the closer does the magnetic compass card hug the meridian in spite of the complete turning movement of the craft. Thus, by reference to graph 57, representing an undamped Z period of 600 seconds, it will be seen that the degree of oscillation of the card to either side of the meridian during a complete turn of the craft has been substantially reduced relative to the oscillation indicated by graph 56 representing an undamped Z period of 360 seconds. In other words, we have discovered that if the undamped Z period of a magnetic compass is increased to a point where in response to a complete turn of the craft in azimuth, the card does not move to either side of the meridian through an angle sufficient to cause the card to follow the craft, then we have obtained an instrument by which a pilot can make complete turns in azimuth without the aid of other instruments. The outside limit of oscillation of the card to prevent the card following the craft in azimuth is a maximum of 90° to either side, and if the undamped Z period of the card is increased sufficiently so that in response to complete turning of the craft in azimuth the card does not oscillate beyond 90° either side of the meridian, then the magnetic compass may be utilized as a base to indicate to the pilot the proper direction and rate of turn. Preferably, however, the undamped Z period will be made large enough so that the oscillations of the card to either side of the meridian will be reduced to a negligible value. It will readily be apparent that the compass having an undamped Z period of 600 seconds, as indicated by graph 57, will have a card which is so close to the meridian at all times throughout a complete turn of the craft on which it is mounted, that said card may be utilized as the sole guiding instrument for the pilot in place of the directional gyro and turn indicator heretofore employed.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. A magnetic compass adapted to be mounted on an aircraft, comprising a pendulous magnetic meridian seeking element having predetermined magnetic moment and predetermined moment of inertia about the Z-axis and means for supporting said element for universal movement, the relation of said moment of inertia to said magnetic moment being such that the card lags behind the earth's field vector in the plane of the card and oscillates to either side of the meridian for every complete turn of the craft of 360° in azimuth.

2. A magnetic compass adapted to be mounted on an aircraft, comprising a pendulous magnetic meridian seeking element having predetermined magnetic moment and predetermined moment of inertia about the Z-axis and means for supporting said element for universal movement, the relation of said moment of inertia to said magnetic moment being such as to result in an undamped Z period of said element in excess of a critical period, said critical period being defined as the compass period below which said element will make a complete turn of 360° in azimuth for every complete turn of 360° of the craft and in the same direction when the angle of bank exceeds the complement of the angle of dip and above which said element will oscillate to either side of the meridian for every complete turn of the craft of 360° in azimuth.

3. A magnetic compass adapted to be mounted on an aircraft, comprising a pendulous magnetic meridian seeking element having predetermined magnetic moment and predetermined moment of inertia about the Z-axis and means for supporting said element for universal movement, the relation of said moment of inertia to said magnetic moment being such as to result in an undamped Z period of said element in excess of a critical period, said critical period being defined as the compass period below which said element will make a complete turn of 360° in azimuth for every complete turn of 360° of the craft and in the same direction when the angle of bank exceeds the complement of the angle of dip and above which said element will oscillate to either side of the meridian for every complete turn of the craft of 360° in azimuth, said critical period in magnetic latitude 72 degrees being greater than 3 minutes.

4. A magnetic compass of the type used on an aircraft, comprising a housing adapted for attachment to such aircraft, a pendulous indicating system in said housing provided with an associated magnetic meridian-seeking element, and means for mounting said system in said housing for universal movement; the effective moment of inertia of said system and the magnetic moment of said element being relatively proportioned to give a period of undamped oscillation in azimuth which is greater than the critical period at which the system ceases to have a characteristic rotation through 360° caused by the natural forces impressed in flight on an aircraft in flight and turning through 360° at an angle of bank in excess of the complement of the angle of dip.

5. A magnetic compass of the type used on an aircraft, comprising a housing adapted for attachment to such aircraft, a pendulous indicating system in said housing provided with an associated magnetic meridian-seeking element, and means for mounting said system in said housing for universal movement; the effective moment of inertia of said system and the magnetic moment of said element being relatively proportioned to give a period of undamped oscillation in azimuth which is greater than the critical period at which said system ceases to rotate 360° under the natural forces impressed by a complete turn of the aircraft at an angle of bank in excess of the complement of the angle of dip, said critical period for latitudes having an angle of dip of approximately 72° being approximately 180 seconds.

6. A magnetic compass of the type used on an aircraft, comprising a housing adapted for mounting on such aircraft, a pendulous indicating system in said housing having a compass card and an associated magnetic meridian-seeking element, and means for mounting said system in said housing for universal movement; said system being relatively proportioned to have an effective distribution of inertia giving a moment thereof about the Z-axis which is correlated to the shape, size and magnetic intensity determining the magnetic moment of said element in a manner giving a resultant period of undamped oscillation to the motion of said card about the Z-axis which is relatively long and greater than the critical value at which the motion of the card ceases to rotate through 360° while the aircraft is making a complete turn at an angle of bank in excess of the complement of the angle of dip, said oscillation being about the magnetic meridian.

7. The method of reducing the northerly turning error encountered in magnetic compasses having a housing mounted on aircraft, which comprises the steps of mounting in said housing an indicating system in a pendulous manner and capable of universal movement, associating a magnetic meridian-seeking element with said system, and proportioning the effective moment of inertia of said system to the magnetic moment of said element in a manner such that the resulting period of undamped oscillation about the Z-axis is greater than the critical period at which the system ceases to have characteristic rotation through 360° caused by the natural forces acting when such aircraft is making a 360° turn at an angle of bank in excess of the complement of the angle of dip.

CHARLES STARK DRAPER.
WALTER McKAY.